US008555107B2

(12) United States Patent
Yasui et al.

(10) Patent No.: US 8,555,107 B2
(45) Date of Patent: Oct. 8, 2013

(54) COMPUTER SYSTEM AND DATA PROCESSING METHOD FOR COMPUTER SYSTEM

(75) Inventors: Takashi Yasui, Fuchu (JP); Toshiyuki Ukai, Machida (JP)

(73) Assignee: Hitachi, Ltd., Tokyo (JP)

( * ) Notice: Subject to any disclaimer, the term of this patent is extended or adjusted under 35 U.S.C. 154(b) by 326 days.

(21) Appl. No.: 13/012,094

(22) Filed: Jan. 24, 2011

(65) Prior Publication Data
US 2012/0084597 A1 Apr. 5, 2012

(30) Foreign Application Priority Data

Sep. 30, 2010 (JP) .................................. 2010-220223

(51) Int. Cl.
G06F 11/00 (2006.01)
(52) U.S. Cl.
USPC .......................................... 714/4.11; 711/162
(58) Field of Classification Search
USPC .................................. 714/4.11, 6.2; 711/162
See application file for complete search history.

(56) References Cited

U.S. PATENT DOCUMENTS

| 7,203,871 | B2 * | 4/2007 | Turner et al. ................... 714/710 |
| 7,734,643 | B1 * | 6/2010 | Waterhouse et al. ......... 707/770 |
| 7,818,607 | B2 * | 10/2010 | Turner et al. ................. 714/6.12 |
| 7,836,174 | B2 * | 11/2010 | Lunde ............................ 709/224 |
| 8,108,713 | B2 * | 1/2012 | Turner et al. ................... 714/6.2 |
| 8,281,181 | B2 * | 10/2012 | Resch .............................. 714/6.2 |
| 2002/0162047 | A1 * | 10/2002 | Peters et al. ....................... 714/5 |
| 2005/0010835 | A1 * | 1/2005 | Childs et al. ....................... 714/6 |
| 2007/0234107 | A1 * | 10/2007 | Davison ........................... 714/6 |
| 2008/0183991 | A1 * | 7/2008 | Cosmadopoulos et al. .. 711/162 |
| 2009/0063796 | A1 * | 3/2009 | Surtani et al. ................. 711/162 |
| 2012/0324275 | A1 * | 12/2012 | Resch et al. ................... 714/6.2 |

FOREIGN PATENT DOCUMENTS

| JP | 2000-322292 A | 11/2000 |
| JP | 2001-100149 A | 4/2001 |

OTHER PUBLICATIONS

GemStone Systems, Inc., GemFire Enterprise, Technical White Paper, 2007.

* cited by examiner

Primary Examiner — Yolanda L Wilson
(74) Attorney, Agent, or Firm — Mattingly & Malur, PC

(57) ABSTRACT

A plurality of computers to execute jobs, a management computer to manage the execution of jobs and the disposition of data in the computers and a storage device storing data are interconnected via a network. The management program for the management computer divides the data into distributed data according to hint information and distributively disposes the distributed data and their replicas in memory storages allocated in memories of the computers. The computers execute the job using the distributed data allocated to their own memory. In the event of a fault in any of the computers, the management computer requests computers having the replicas of those distributed data disposed in the faulted computer to re-execute the job.

10 Claims, 18 Drawing Sheets

FIG.2

| 300 | 310 | 320 | 330 | 340 | 350 | 360 |
|---|---|---|---|---|---|---|
| DATA ID | RECORD LENGTH | DISTRIBUTION KEY | DISTRIBUTED DATA ID | DISTRIBUTION KEY RANGE | RECORD NUMBER | MEMORY ADDRESS |
| D0 | 100B | F0 | D0_0 | K0-K99 | 600 | 0x1000 0000 |
| | | | D0_1_1 | K175-K199 | 100 | 0x1004 0000 |
| | | | D0_2_0 | K200-K244 | 100 | 0x1008 0000 |
| D1 | 100B | F0 | D1_0 | K0-K99 | 100 | 0x2000 0000 |
| | | | D1_1_1 | K175-K199 | 25 | 0x2004 0000 |
| | | | D1_2_0 | K200-K244 | 25 | 0x2008 0000 |
| ... | ... | ... | ... | ... | ... | ... |

| JOB ID 400 | INPUT DATA ID 410 | OUTPUT DATA ID 420 | DISTRIBUTION NUMBER 430 | COMPUTER ID 440 | EXECUTION STATUS 450 | RE-EXECUTION ID 460 |
|---|---|---|---|---|---|---|
| J0 | D0,D1 | D2 | 3 | C0 | Running | — |
|  |  |  |  | C1 | Normal End | — |
|  |  |  |  | C2 | Abnormal End | RJ0_2 |
| J1 | D2 | D3 | 3 | C0 | Waiting | — |
|  |  |  |  | C1 | Waiting | — |
|  |  |  |  | C2 | Waiting | — |
| ... | ... | ... | ... | ... | ... | ... |

| RE-EXECUTION ID 500 | DISTRIBUTION NUMBER 510 | COMPUTER ID 520 | EXECUTION STATUS 530 |
|---|---|---|---|
| RJ0_2 | 2 | C0 | Waiting |
| | | C1 | Running |
| ⋮ | ⋮ | ⋮ | ⋮ |

| DISTRIBUTED MEMORY ID 600 | COMPUTER NUMBER 610 | COMPUTER ID 620 | TOTAL MEMORY AREA 630 | EMPTY MEMORY AREA 640 |
|---|---|---|---|---|
| 0 | 3 | C0 | 8GB | 7GB |
| | | C1 | 8GB | 7GB |
| | | C2 | 8GB | 7GB |
| 1 | 3 | C3 | 4GB | 4GB |
| | | C4 | 4GB | 4GB |
| | | C5 | 4GB | 4GB |
| ⋮ | ⋮ | ⋮ | ⋮ | ⋮ |

| DATA ID 700 | DISTRIBUTION NUMBER 710 | DISTRIBUTION KEY 720 | DISTRIBUTED DATA ID 730 | DISTRIBUTION KEY RANGE 740 | RECORD NUMBER 750 | COMPUTER ID 760 | REPLICA ID 770 |
|---|---|---|---|---|---|---|---|
| D0 | 3 | F0 | D0_0 | K0 - K99 | 600 | C0 | RD0_0 |
| | | | D0_1 | K100 - K199 | 100 | C1 | RD0_1 |
| | | | D0_2 | K200 - K299 | 100 | C2 | RD0_2 |
| D1 | 3 | F0 | D1_0 | K0 - K99 | 100 | C0 | RD1_0 |
| | | | D1_1 | K100 - K199 | 25 | C1 | RD1_1 |
| | | | D1_2 | K200 - K299 | 25 | C2 | RD1_2 |
| ... | ... | ... | ... | ... | ... | ... | ... |

FIG.7

| REPLICA ID 800 | DISTRIBUTION NUMBER 810 | DISTRIBUTED DATA ID 820 | DISTRIBUTION KEY RANGE 830 | RECORD NUMBER 840 | COMPUTER ID 850 |
|---|---|---|---|---|---|
| RD0_0 | 2 | D0_0_0 | K0 - K49 | 300 | C1 |
|  |  | D0_0_1 | K50 - K99 | 300 | C2 |
| RD0_1 | 2 | D0_1_0 | K100 - K174 | 300 | C2 |
|  |  | D0_1_1 | K175 - K199 | 100 | C0 |
| RD0_2 | 2 | D0_2_0 | K200 - K224 | 100 | C0 |
|  |  | D0_2_1 | K225 - K299 | 300 | C1 |
| ... | ... | ... | ... | ... | ... |

FIG.8

| 226 | | | | | | | |
|---|---|---|---|---|---|---|---|
| DATA ID 900 | DISTRIBUTION NUMBER 910 | DISTRIBUTION KEY 920 | DISTRIBUTION KEY RANGE 930 | REDISTRIBUTION PROCESS PERMISSION 940 | REPLICATION POLICY 950 | REDISTRIBUTION RANGE 960 | REJOINING PROCESS 970 |
| D0 | 3 | F0 | K0 - K99 | OK | Leveling | — | Merge+Sort |
| | | | K100 - K199 | OK | Leveling | — | |
| | | | K200 - K299 | OK | Leveling | — | |
| D1 | 3 | F0 | K0 - K99 | OK | Leveling | — | Merge+Sort |
| | | | K100 - K199 | OK | Leveling | — | |
| | | | K200 - K299 | OK | Leveling | — | |
| ... | ... | ... | ... | ... | ... | ... | ... |

COMPUTER SYSTEM AND DATA PROCESSING METHOD FOR COMPUTER SYSTEM

INCORPORATION BY REFERENCE

The present application claims priority from Japanese application JP2010-220223 filed on Sep. 30, 2010, the content of which is hereby incorporated by reference into this application.

BACKGROUND OF THE INVENTION

The present invention relates to a computer system and a data processing method in the computer system and more particularly to a computer system for parallelly processing a large volume of data by a plurality of computers and a data processing method in the event of a fault.

In recent years, the volume of data processed by computer systems has been growing explosively. This in turn has increased the time taken by data processing, giving rise to a problem of a job failing to be finished within a predetermined time. To speed up data processing, it is increasingly necessary that a large volume of data be processed with a plurality of parallelly connected computers.

Among technologies for processing large volumes of data using a plurality of computers may be cited a distributed memory technology, like the one described in a document: GemStone Systems, Inc., "GemFireEnterprise," Technical White Paper, 2007. The distributed memory technology is a technology that integrates memories provided in a plurality of computers into one logical memory space in which to store data. In the distributed memory technology, since data is practically disposed distributed among memories of a plurality of computers, these distributed data can be processed by these computers parallelly. Further, since data is disposed in memories of the computers, data transfers to and from external storages such as disk drives are reduced. This in turn results in an increased speed of data processing.

The distributed memory technology, on the other hand, has a risk that, in the event of a fault in a computer, data held in that computer may be lost. To deal with this problem, it is a common practice in the distributed memory technology that the data held in the memory of a computer is replicated and that the replica of data is disposed in a memory of another computer to avoid a possible loss of data that would otherwise occur in the invent of a fault. When a fault has occurred in a computer, the operation that was being executed by that computer at the time of fault can be executed again by the second computer that holds the data replica. It is noted, however, that because the re-execution of the operation by the second computer in the event of a fault is done only after the second computer has finished the operation that was being executed at the time of fault, the completion of the overall data processing is delayed by the fault.

To speed up the re-execution of operation using the replicated data in the event of a computer fault, a technology is available to distributively dispose data in secondary memory devices of other computers, such as shown in JP-A-2000-322292 and JP-A-2001-100149. The technology disclosed in these patent documents has a replica of the data held by a computer distributively disposed in secondary memory devices of a plurality of other computers. When a fault occurs with a computer, a plurality of other computers with a secondary memory device holding the replica of the data held by the faulted computer parallelly process the data, thus reducing the time taken by the re-execution.

SUMMARY OF THE INVENTION

In distributing a large volume of data among a plurality of computers, the aforementioned conventional distributed memory technology uses specific information as a key, such as a name of stock to be traded. So, the volume of data held in a computer differs from one computer to another, depending on what information is used as a key in distributing data. Therefore, simply distributing a replica of data contained in each computer to different computers, as described in JP-A-2000-322292 and JP-A-2001-100149, can hardly level the data processing executed by individual computers, including the time taken by the re-execution.

The present invention has been accomplished with a view to overcoming the problem described above. That is, its objective is to level data processing, including a re-execution in the event of a fault, in a computer system that parallelly processes a large volume of data with a plurality of computers.

The above object and novel features of this invention will become apparent from the following description and the accompanying drawings.

Of the inventions disclosed in this application, representative ones may be briefly summarized as follows.

Viewed from one aspect the present invention provides a computer system having a storage device storing data, a plurality of first computers connected with the storage device and adapted to manage data processing using the data, and a plurality of second computers connected with the first computers and adapted to distributively execute the data processing. The first computers each have a distributive disposition unit and an execution management unit. The distributive disposition unit references given hint information indicating a policy of distributive disposition of the data in a plurality of the second computers, divides the data held in the storage device into a plurality of pieces of distributed data and distributively disposes the pieces of the distributed data and each piece of replicated data of the distributed data into memories of the plurality of the second computers. The execution management unit requests the second computers to execute the data processing and, in the event of a fault in any of the second computers, requests another second computer to re-execute the data processing that was being executed in the faulted second computer at the time of fault. The second computers each have a memory management unit and a data processing unit. The memory management unit holds the distributed data in a memory of its own computer in response to a request from the distributive disposition unit, and the data processing unit executes the data processing in response to a request from the execution management unit.

Another aspect of the present invention provides a data processing method in a computer system, wherein the computer system includes a plurality of first computers to distributively execute data processing, a second computer to manage the execution of the data processing by the plurality of the first computer, a storage device storing data used in the data processing, and a network interconnecting the plurality of the first computers, the second computer and the storage devices. According to hint information given to the second computer and indicating a policy on the distributive disposition of the data in the first computers, the data processing method divides the data held in the storage device into a plurality of pieces of distributed data and distributively disposes the distributed data and replicated data of each piece of the distributed data in memories of the plurality of the first computers. It further performs data processing by the plurality of the first computers using the distributed data disposed in each of the first computers and, in the event of a fault in any of the first computers, re-executes the data processing, that was being executed in the faulted first computer at the time of fault, by another first computer that holds the replicated data of those distributed data disposed in the faulted first computer.

Of the inventions disclosed in this application, a representative one may briefly be summarized as follows.

In a computer system that parallelly processes a large volume of data with a plurality of computers, this invention can level the load of data processing, including the re-execution of job in the event of a fault, among the computers.

Other objects, features and advantages of the invention will become apparent from the following description of the embodiments of the invention taken in conjunction with the accompanying drawings.

BRIEF DESCRIPTION OF THE DRAWINGS

FIG. 2 is a conceptual diagram showing a data structure of memory storage management information 212 used to manage distributed data 214 disposed in a memory storage 213.

FIG. 3 is a conceptual diagram showing a data structure of job execution management information 222.

FIG. 4 is a conceptual diagram showing a structure of re-execution information.

FIG. 5 is a conceptual diagram showing a structure of distributed memory storage management information 224.

FIG. 6 is a conceptual diagram showing a structure of distributed data disposition information 225.

FIG. 7 is a conceptual diagram showing a structure of replica information.

FIG. 8 is a conceptual diagram showing a structure of distributed data disposition hint information 226.

DESCRIPTION OF THE EMBODIMENTS

Figure 1:
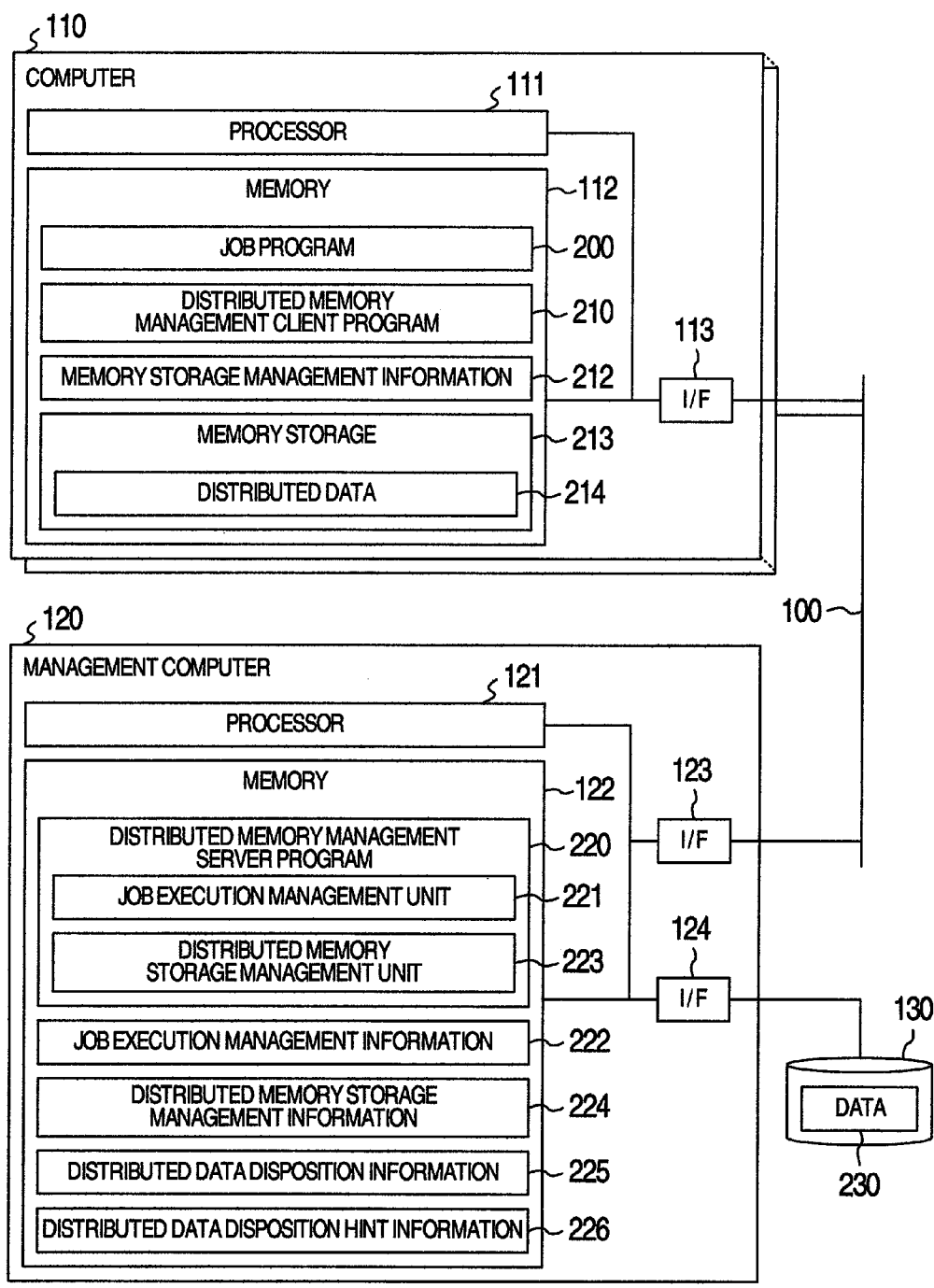
FIG. 1 is a block diagram showing an outline configuration of a computer system as one embodiment applying the present invention.

Now, embodiments of this invention will be described by referring to the accompanying drawings. In all the drawings identical members are basically assigned the same reference numerals and their repetitive explanations omitted.

FIG. 1 is a block diagram showing an outline configuration of an example computer system applying the present invention.

The computer system of this embodiment includes a plurality of computers 110 to execute jobs; a management computer 120 to manage the execution of jobs by the computers 110; and a storage 130 in which to store data input to jobs executed by the computers 110 and data output from the executed jobs. The computers 110 are interconnected among them and also with the management computer 120 through a network 100.

The computers 110 each have a processor 111 for computation, a memory 112 for storing programs and data, and an interface 113 for connecting the computer 110 to the network 100.

The management computer 120 includes a processor 121 for computation, a memory 122 for storing programs and data, and an interface 123 for connecting the management computer 120 to the network 100 and an interface 124 for connecting it to the storage 130.

In the memory 112 of each computer 110 there are stored a job program 200 that is executed by the processor 111 to do the job requested by the management computer 120 and a distributed memory management client program 210 to be executed by the processor 111 to manage the distributed memory made up of the memories 112 of the individual computers 110. These programs do not need to be stored in the memory 112 at all times but may be stored in an external storage, such as a disk drive not shown, and read onto the memory 112 as needed for execution by the processor 111.

In the memory 112 of each computer 110 the distributed memory management client program 210 described later allocates a memory storage 213 to build the distributed memory. These memory storages 213 are provided as one logical storage by the distributed memory management server program 220 and the distributed memory management client program 210. In this specification this unified storage is called a distributed memory. Data to be stored in the distributed memory is distributed as distributed data 214 among the memory storages 213 allocated in the plurality of computers 110. In the memory 112 of each computer 110 there is held memory storage management information 212 that the distributed memory management client program 210 in each computer uses to manage the distributed data 214 disposed in the memory storage 213.

In the memory 122 of the management computer 120 there is stored a distributed memory management server program 220 that is executed by the processor 121 to manage the distributed memory made up of memories 112 of the plurality of computers 110. The distributed memory management server program 220, like the job program 200 and the distributed memory management client program 210, may also be stored in an external storage not shown, read onto the memory 122 as needed and executed by the processor 121.

The distributed memory management server program 220 has a job execution management unit 221 that manages jobs to be executed by the computers 110 and a distributed memory storage management unit 223 that, together with the distributed memory management client program 210, manages the distributed memory. Also held in the memory 122 are job execution management information 222 used by the job execution management unit 221 to manage jobs executed by the plurality of computers 110, distributed memory storage management information 224 and distributed data disposition information 225, both of which are used by the distributed memory storage management unit 223 to manage the distributed memory and distributed data disposed in the distributed memory, and distributed data disposition hint information 226.

In this embodiment, data 230 used for execution of jobs are managed in specified units, such as files, and stored in the storage 130. The data 230 is read from the storage 130 before starting job executions and distributively disposed as distributed data 214 in the memory storages 213 in memories 112 of the individual computers 110. In executing the jobs, the job program 200 on each of the computers 110 uses the distributed data 214 disposed in the memory storage 213 in its own computer 110. When the job that was being executed by the computers 110 is completed, the distributed data 214 updated by the job are unified and stored as the data 230 in the storage 130. In this embodiment, as described above, the job using the data 230 is executed distributively on a plurality of computers 110.

In this embodiment the data 230 has a plurality of records. Each of the records includes at least one field holding values as data.

FIG. 2 is a conceptual diagram showing a data structure of the memory storage management information 212 used to manage the distributed data 214 disposed in the memory storage 213 allocated in the memory 112 of the computer 110 on which the distributed memory management client program 210 runs. In the diagram, while the memory storage management information 212 is shown in a table form, it can be implemented using any desired data structure, such as arrays and list structures, etc., that can relate different groups of information items. This also applies to other information described in the following.

The memory storage management information 212 includes: a data identifier (ID) 300 to identify the data 230 stored in the storage 130 that represents original data of the distributed data 214 disposed in the memory 112; a record length 310 of each record making up the data; a distribution key 320, an ID of the field used as a key in distributively disposing the data 230 in the distributed memory; a distributed data ID 330 that identifies the distributed data 214 disposed in the memory storage 213; a distribution key range 340 included in each distributed data 214 identified by the distributed data ID 330 and representing the range of value in a field determined by the distribution key 320; a record number 350 representing the number of records included in the distributed data 214 identified by the distributed data ID 330; and a memory address 360 representing the location within the memory storage 213 of the distributed data 214 identified by the distributed data ID 330.

When, in the memory storage management information 212 of FIG. 2, the data with data ID "D0" is considered for example, it is seen that the data is made up of three groups of distributed data with a distribution key of "F0"—first group of 600 records in a key range of "K0-K99" with a distributed data ID of "D0_0", disposed in an area beginning at a memory address "0x10000000", a second group of 100 records in a key range of "K175-K199" with a distributed data ID of "D0_1_1", disposed in an area beginning at a memory address "0x10040000", and a third group of 100 records in a key range of "K200-K244" with a distributed data ID of "D0_2_0", disposed in an area beginning at a memory address "0x10080000". As described later, the distributed data with distributed data ID of "D0_1_1" and "D0_2_0" represent parts of replicas of those distributed data "D0" that are identified by distributed data ID "D0_1" and "D0_2" and disposed in other computers 110.

FIG. 3 is a conceptual diagram showing a data structure of the job execution management information 222.

The job execution management information 222 is used by the job execution management unit 221 to manage jobs that are distributively executed by a plurality of computers 110. It includes a job ID 400 to identify each job; an input data ID 410 to identify the data 230 used as inputs for jobs; an output data ID 420 to identify data output as a job execution result; a distribution number 430 representing the number of computers 110 that distributively execute a job or the number of part jobs to be distributively executed; a computer ID 440 to identify the computers 110 that distributively execute a job; an execution status 450 representing the state of a job being distributively executed by the computers 110; and a re-execution ID 460 to identify information on re-execution of a job in the event of a fault in the computer 110 that has been executing the job.

It is seen from the job execution management information 222 of FIG. 3 that job "J0" is one that takes in data "D0", "D1" as input data and outputs data "D2" and that it is distributively executed by three computers 110 with computer IDs "C0", "C1", "C2". In the execution status 450 the following information indicating the status of job execution is set for each of the computers involved in distributively executing the job: "Running" indicating that the job allocated to the computer is being executed; "Normal End" indicating the job has ended normally; "Abnormal End" indicating the job has ended abnormally due to a fault in the computer; and "Waiting" indicating that the job is waiting to be executed.

FIG. 4 is a conceptual diagram showing a structure of re-execution information.

The re-execution information 460 is used by the job execution management unit 221 to manage the statuses of jobs to be re-executed (hereinafter referred to as re-execution jobs) when a job that was being executed in one of the computers 110 at time of fault is re-executed by another computer 110. The re-execution information includes a re-execution ID 500 to identify a re-execution job, a distribution number 510 for a re-execution job identified by the re-execution ID 500, a computer ID 520 to identify the computer to which a re-execution job is assigned, and execution status information 530 representing the execution status of the re-execution job allocated to each computer.

The distribution number 510 in this embodiment represents the number of computers that distributively execute the re-execution jobs identified by the re-execution ID 500, For one re-execution ID 500, the same number of computer IDs 520 as that specified by the distribution number 510 and the execution status information 530 are set. The re-execution ID 500 corresponds to the re-execution ID 460 for the job execution management information 222. The execution status of the re-execution job associated with a specific job can be managed using the re-execution information in which the same re-execution ID as the re-execution ID 460 is set. Thus by referring to FIG. 3 and FIG. 4, it is understood that the re-execution job "RJ0_2" of a job that was a part of the job "J0" and which was being executed by the computer "CT" is to be distributively executed by two computers 110 "C0", "C1", with the re-execution job in the computer "C0" in the "Waiting" state and the re-execution job in the computer "C1" in the "Running" state or being executed.

In this embodiment the re-execution information is supposed to be held in the memory 122 as information accompanying the job execution management information 222. Although in this embodiment the job managed by the job execution management information 222 and the re-execution information on the re-execution job associated with the job are related with each other by the re-execution IDs 460, 500, they may be associated by using pointer information leading to the associated re-execution information, instead of the re-execution ID 460, or by directly holding the re-execution information as part of the job execution management information 222.

FIG. 5 is a conceptual diagram showing a structure of the distributed memory storage management information 224.

The distributed memory storage management information 224 is used by the distributed memory storage management unit 223 to manage the distributed memory composed of memories of a plurality of computers 110. In this embodiment, the distributed memory storage management unit 223 can build a plurality of distributed memory storages. The distributed memory storage management information 224 includes a distributed memory ID 600 to identify individual distributed memory storages, a computer number 610 representing the number of computers 110 used in forming the distributed memory identified by the distributed memory ID 600, a computer ID 620 of each of the computers 110 used to build the distributed memory, a total memory area information 630 indicating a total memory capacity of the distributed memory, and empty memory area information 640 representing a memory capacity in the distributed memory that is available for use.

Referring to the distributed memory storage management information 224 in FIG. 5, the distributed memory identified by distributed memory ID "0", for example, is made up of areas on the memories 112 in those computers 110 identified by the computer IDs "C0", "C1" and "C2", each with a total memory capacity of 8 GB and an empty memory area of 7 GB.

FIG. 6 is a conceptual diagram showing a structure of the distributed data disposition information 225.

The distributed data disposition information 225 is used by the distributed memory storage management unit 223 to manage the disposition of data in the distributed memory. It includes a data ID 700 to identify data 230 which constitutes the original of distributed data 214 disposed distributively in the memories 112 of a plurality of computers 110; a distribution number 710 representing the number of pieces of data 230 distributively disposed in the memories 112 of the computers, i.e., the number of divided pieces of data 230 or the number of pieces of distributed data 214 after data division; a distribution key 720 to identify a field used as a key when dividing the data 230 into distributed data 214; a distributed data ID 730 to identify each piece of distributed data; a distribution key range 740 representing a range of value that the field specified by the distribution key 720 holds in each piece of distributed data; a record number 750 representing the number of records included in each piece of distributed data; a computer ID 760 of a computer 110 in which each piece of distributed data is disposed; and a replica ID 770 representing information on a replica of distributed data used during the re-execution of a job.

Referring to the distributed data disposition information 225 shown in FIG. 6, it is understood that data "D0" is divided into three pieces of distributed data with a field "F0" taken as a distribution key and is distributively disposed in computers "C0", "C1" and "C2". The three groups of distributed data are each assigned a distributed data ID 730 "D0_0", "D0_1", "D0_2" and respectively include 600 records in a field "F0" of "K0-K99", 100 records in a field of "K100-K199" and 100 records in a field of "K200-K299". It is also understood that the replica information about replicated data of each group of distributed data is represented by a replica ID "RD0_0", "RD0_1", "RD0_2".

FIG. 7 is a conceptual diagram showing a structure of replica information. In this embodiment a replica of distributed data (hereinafter referred to as replicated data) is further divided and distributively disposed in a plurality of computers 110 other than those in which original distributed data is disposed. In the following, a portion of replicated data disposed in one computer is referred to as partial replicated data.

The replica information includes information about a plurality of pieces of replicated data. The replica information about each piece of replicated data includes a replica ID 800 to identify the replica information; a distribution number 810 representing the number of computers in which to dispose replicated data; a distributed data ID 820 to identify partial replicated data distributively disposed in computers; a distribution key range 830 indicating the range of data included in the partial replicated data identified by the distributed data ID 820; a record number 840 representing the number of records included in the partial replicated data identified by the distributed data ID 820, and a computer ID 850 representing the computer 110 in which each piece of partial replicated data is disposed.

In FIG. 7 replica information "RD0_0", for example, is shown to have its replicated data distributively disposed in two computers and to comprise two pieces of partial replicated data that are assigned distributed data ID "D0_0_0" and "D0_0_1". It is also seen that the partial replicated data "D0_0_0" includes 300 records in a distribution key range of "K0-K49" and is disposed in a computer "C1" and that the partial replicated data "D0_0_1" includes 300 records in a distribution key range of "K50-K99" and is disposed in a computer "C2". Reference to the distributed data disposition information 225 of FIG. 6 reveals that the replica information "RD0_0" is information about the replicated data of the distributed data "D0_0", a part of the data "D0".

In this embodiment the replica information is supposed to be held in the memory 122 as information accompanying the distributed data disposition information 225. Further, although in this embodiment the distributed data and the replica information about the replicated data are related to each other by the replica ID 770, 800, they may be related by using pointer information leading to the associated replica information, instead of the replica ID 770, or by holding the replica information as part of the distributed data disposition information 225.

FIG. 8 is a conceptual diagram showing a structure of the distributed data disposition hint information 226.

The distributed data disposition hint information 226 includes a data ID 900 of data 230 to be distributively disposed; a distribution number 910 representing the number of computers 110 in which the data 230 is distributively disposed, i.e., the number of divided pieces of data 230 or the number of pieces of distributed data 214 after data division; a distribution key 920 to identify a field used as a key when dividing the data 230; a distribution key range 930 representing a range of value held in a field that is used as a key for distributed data 214 when distributively disposing the data 230; a redistribution process permission 940 indicating whether, during the process of making a replica of distributed data for re-execution of a job, the replica of distributed data can further be distributed for processing; a replication policy 950 representing a policy when duplicating the distributed data; a redistribution range 960 specifying a range of data in which, during the process of making a replica of distributed data, the replica of the distributed data is further distributed; and a rejoining process information 970 specifying a method of processing those data written into the memory storages 213 of the computers 110 which have been acquired as a result of using the replica of distributed data and re-executing the job 200 in the event of a fault in a computer 110.

The information set as the replication policy 950 includes "leveling" which, in making a replica of distributed data, demands the leveling of processing load among computers that participate in performing the re-execution job during the job re-execution process and "fixed key range" that specifies in advance the range of value in the fields designated by the distribution key 920. If the replication policy 950 is set with the "fixed key range", the range of value in the fields designated by the distribution key 920, which is used in dividing the distributed data, is set in the redistribution range 960 for each piece of distributed data.

The rejoining process information 970 may include information specifying merge and sort operations to be performed on those data output to the memory storages 213 of computers 110 as a result of distributing and executing the job 200. The rejoining process information 970 may also be configured to accept other processing, such as a statistics operation that stacks output data or an operation prepared by the user. The execution of the operation designated here now can produce the same distributed data as the one that would be acquired by executing a job on the original distributed data.

Figure 9:
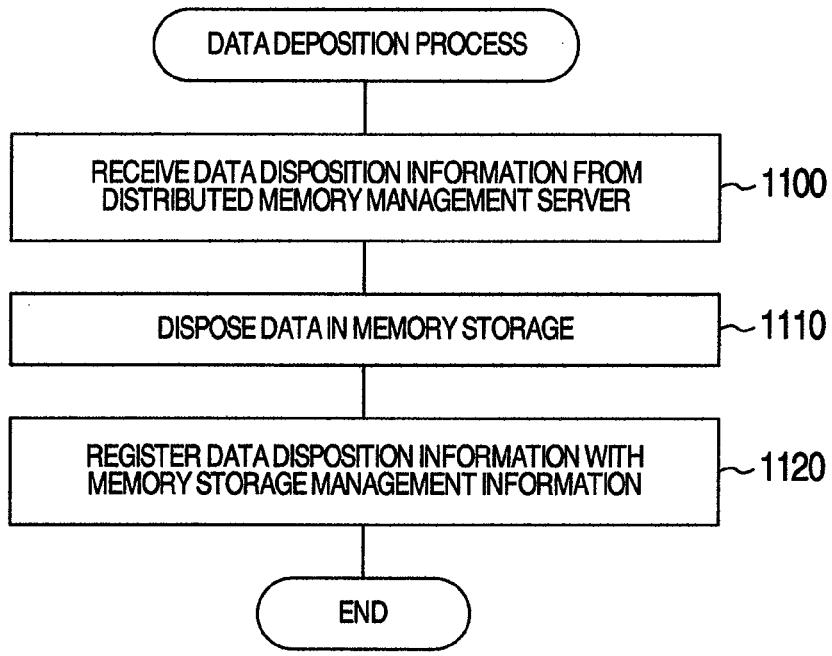
FIG. 9 is a flow chart of a process for disposing data into the memory storage 213, performed by a distributed memory management client program 210.

FIG. 9 is a flow chart of a process performed by the distributed memory management client program 210 in disposing data in the memory storage 213 in this embodiment.

In the data disposition process, the distributed memory management client program 210 accepts information about the disposition of the distributed data 214 from the distributed memory management server program 220 of the management computer 120 (step 1100). The distributed memory management client program 210, according to the received disposition information about the distributed data 214, disposes the distributed data 214 in the memory storage 213 in the memory 122 of its own computer 110 (step 1110). After disposing the distributed data 214 in the memory storage 213, the distributed memory management client program 210 registers with the memory storage management information 212 the received disposition information about the distributed data 214 and the address in the memory storage 213 at which the distributed data 214 is disposed (step 1120).

Figure 10:
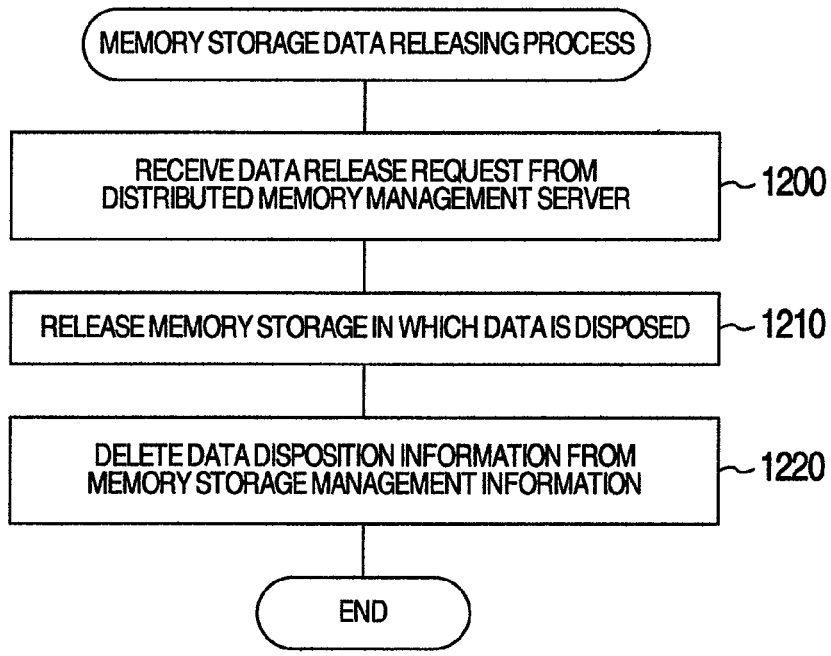
FIG. 10 is a flow chart of a memory storage data releasing process performed by the distributed memory management client program 210.

FIG. 10 is a flow chart of a memory storage data releasing process performed by the distributed memory management client program 210 in this embodiment. The memory storage data releasing process is executed to release the memory storage 213 of the distributed data 214 so that it can be used for storing other data.

In the memory storage data releasing process, the distributed memory management client program 210 first receives from the distributed memory management server program 220 in the management computer 120 a release request as distributed data release information which contains an ID of the distributed data 214 to be released (step 1200). The distributed memory management client program 210, according to the received release information about the distributed data 214, releases the memory storage 213 in which the distributed data 214 is disposed (step 1210). After this, the distributed memory management client program 210 deletes from the memory storage management information 212 the disposition information about the distributed data 214 held in the released memory storage 213 (step 1220).

Figure 11:
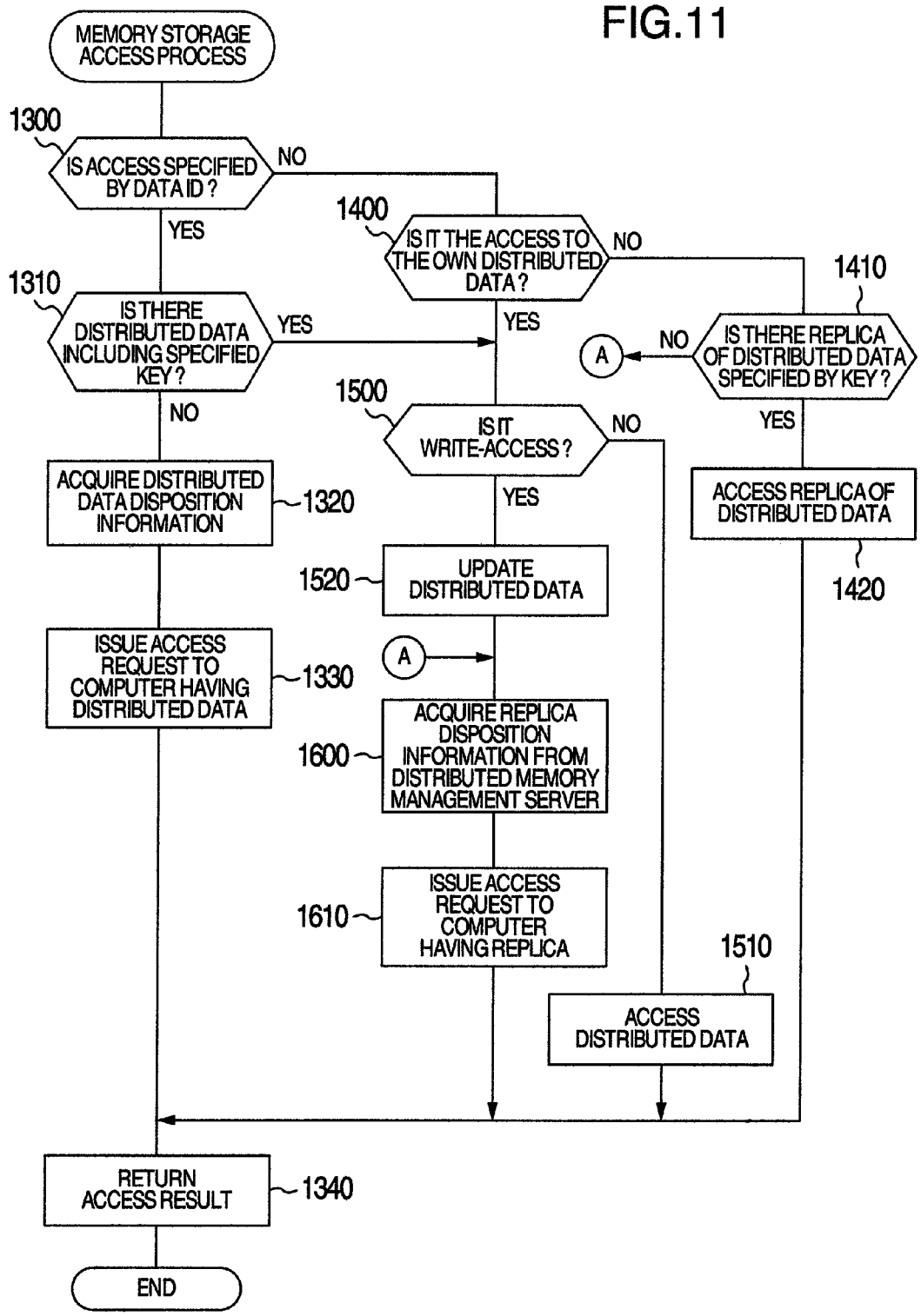
FIG. 11 is a flow chart of a memory storage access process performed by the distributed memory management client program 210.

FIG. 11 is a flow chart of a memory storage access process performed by the distributed memory management client program 210 in response to a request from the job program 200 in this embodiment.

The job program 200, when it accesses the data 230 in executing a job, issues an access request, which contains an ID of the data 230 and a key in the record that it is going to access, to the distributed memory management client program 210 in its own computer 110. The key in this case is a value of the field specified by the distribution key 320. If the access request is to the distributed data, an ID of the distributed data of interest is designated instead of the ID of the original data 230. Upon receiving the access request, the distributed memory management client program 210 references the memory storage management information 212 to check whether the received access request specifies the ID of the original data 230 for the distributed data 214 held in the memory storage 213 of its own computer 110 (step 1300).

If at step 1300 the access request is found to specify the ID of the original data 230, the distributed memory management client program 210 refers to the memory storage management information 212 to see if the distributed data 214 including the key specified by the access request is held in the memory 112 (step 1310).

If at step 1310 it is decided that the distributed data 214 including the specified key is not held in the memory 112, the distributed memory management client program 210 queries the distributed memory management server program 220 in the management computer 120 to acquire information about the computer 110 holding the distributed data 214 including the specified key (step 1320). When it acquires information about the computer 110 holding the distributed data 214 of interest from the distributed memory management server program 220, the distributed memory management client program 210 issues an access request including the specified key and the ID of the distributed data 214 containing that key to a distributed memory management client program 210 in the computer 110 in question (step 1330). Then, the distributed memory management client program 210 in the request issued computer 110 receives from the computer 110 holding the distributed data 214 of interest a record corresponding to the value of the specified key, obtained as a result of accessing the distributed data 214 containing the specified key, and returns the record to the job program 200 (step 1340).

If step 1300 decides that the access request does not specify the ID of the original data 230, i.e., the access request specifies the ID of distributed data, the distributed memory management client program 210 refers to the memory storage management information 212 to check if the access request is to the distributed data 214 held in the memory 112 of its own computer 110 (step 1400).

If the access request is for the distributed data of the original data 230 not held in the memory 112 of its own computer 110, the access request is one for a replica of the distributed data 214 held in the memory storage 213 of other computer 110. In this case, the distributed memory management client program 210 refers to the memory storage management information 212 checks whether the replica of the distributed data including the key specified by the access request from the job program 200 is held in the memory 112. If the replica of the distributed data containing the specified key is found not held in the memory 112, the distributed memory management client program 210 proceeds to step 1600 (step 1410).

If at step 1410 the replica of the distributed data containing the specified key is found held in the memory 112, the distributed memory management client program 210 refers to the memory storage management information 212 and accesses the address in the memory storage 213 where the replica of the distributed data of interest is held (step 1420). Then, the distributed memory management client program 210 receives the result of access to the replica of distributed data and returns it to the job program 200 (step 1340).

If step 1400 decides that the access request is for the distributed data of the original data 230 held in the memory 112, the distributed memory management client program 210 checks whether the access is a write access or not (step 1500).

If the access request from the job program 200 is found not to be a write access, the distributed memory management client program 210 refers to the memory storage management information 212 and accesses the address in the memory storage 213 where the distributed data of interest is held (step 1510). Then the distributed memory management client program 210 receives the result of access to the distributed data and returns it to the job program 200 (step 1340).

If, on the other hand, step 1500 decides that the access request from the job program 200 is a write access, the distributed memory management client program 210 refers to the memory storage management information 212 and updates a record at the address in the memory storage 213 where the distributed data is held.

Next, the distributed memory management client program 210 queries the distributed memory management server program 220 of the management computer 120 and acquires information about a computer 110 in which a replica of the distributed data including the key specified by the access request is disposed (step 1600). Then, the distributed memory management client program 210, based on the information acquired from the distributed memory management server program 220, requests the computer 110 of interest to access the replica of distributed data including the key specified by the access request. This access request includes an ID of the replica of distributed data and the specified key (step 1610). As a final step, the distributed memory management client program 210 returns the result of access to the distributed data including the specified key to the job program 200 (step 1620).

Figure 12:
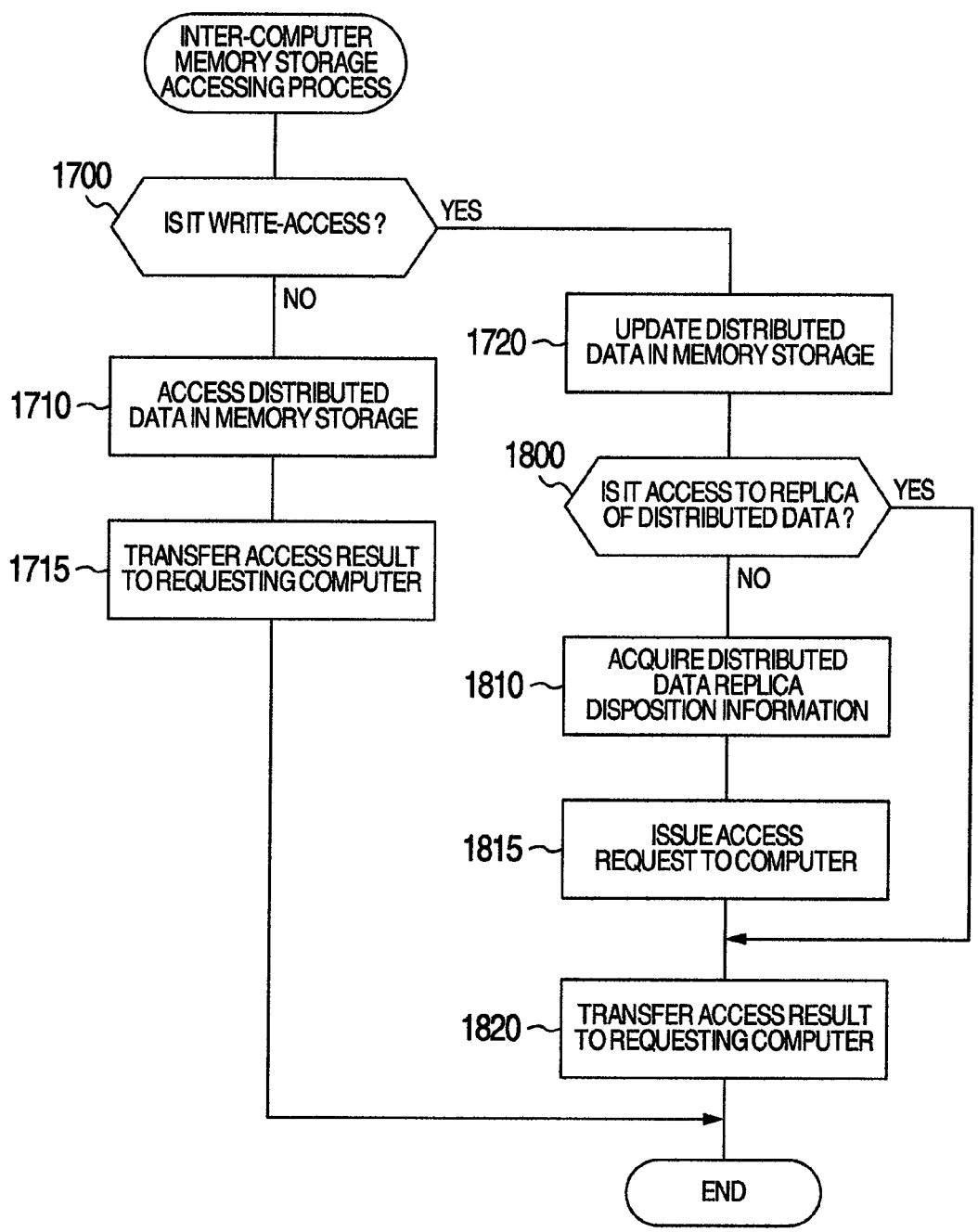
FIG. 12 is a flow chart of an inter-computer memory storage accessing process.

FIG. 12 is a flow chart of an inter-computer memory storage accessing process. When an access request is made to the computer 110 where the distributed data is disposed, the inter-computer memory storage accessing process in step 1330, 1610 of FIG. 11 is performed by the distributed memory management client program 210 in the computer 110 that has received the access request.

When an access request is made by other computer 110, the distributed memory management client program 210 checks if the received access request is one asking for a write access (step 1700). If the received access request is not the write access, the distributed memory management client program 210 refers to the memory storage management information 212, accesses an address in the memory storage 213 where the requested distributed data is held, and acquires the requested data (step 1710). After acquiring the requested record, the distributed memory management client program 210 returns it to the computer 110 that has issued the access request (step 1715).

If on the other hand step 1700 decides that the received access request is a write access request, the distributed memory management client program 210 refers to the memory storage management information 212 and updates the data held at the address in the memory storage 213 where the distributed data is held (step 1720). The client program 210 further references the memory storage management information 212 based on the ID and key of the distributed data specified by the access request and then checks if the received access request is to the replicas of the distributed data (step 1800).

If the received access request is not the one for the replica of the distributed data, the distributed memory management client program 210 queries the distributed memory management server program 220 of the management computer 120 to acquire the information about a computer 110 holding the replica of the distributed data including the specified key (step 1810) and issues an access request for the replica of the distributed data including the specified key to the computer 110 identified by the acquired information (step 1815). Upon receiving the result of the access request it has made for the replica of distributed data, the distributed memory management client program 210 returns the access result to the computer 110, the source of the access request (step 1820).

If step 1800 decides that the received access request is for the replica of the distributed data, the distributed memory management client program 210 skips step 1810 and 1815 and returns the result of access to the distributed data to the computer 110 that has made the access request.

Figure 13:
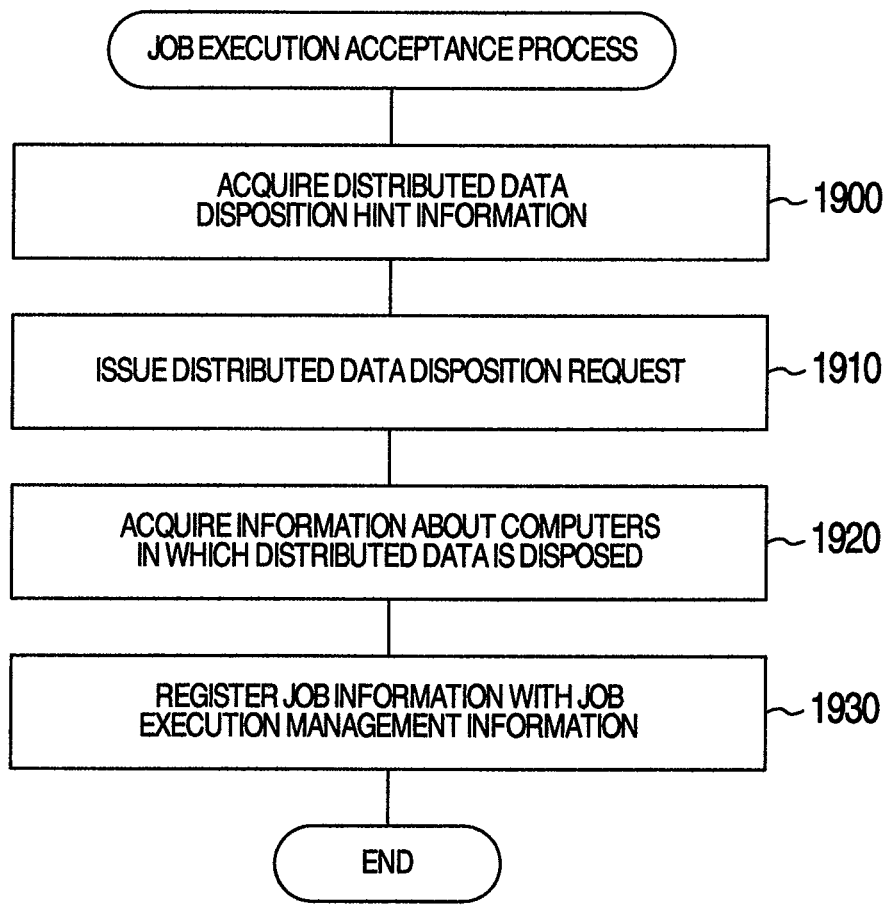
FIG. 13 is a flow chart of a job execution acceptance process performed by a job execution management unit 221.

FIG. 13 is a flow chart of a job execution acceptance process performed by the job execution management unit 221 in this embodiment.

The job execution management unit 221 acquires from the user hint information, according to which the data used during job execution will be distributively disposed in memories of a plurality of computers 110. More specifically, the job execution management unit 221 needs only to acquire information necessary for setting individual items of the distributed data disposition hint information 226, in the form of a file or an input through a user interface such as display and keyboard. The job execution management unit 221 holds the acquired hint information as the distributed data disposition hint information 226 in the memory 122 (step 1900).

Next, the job execution management unit 221 hands the distributed data disposition hint information 226 to the distributed memory storage management unit 223 and requests it to distributively dispose the data 230 into the memories 112 of a plurality of computers 110 (step 1910). After the distributive disposition of the data 230 into the memories 112 of computers 110 is complete, the job execution management unit 221 receives from the distributed memory storage management unit 223 information about the computers 110 in which the distributed data is disposed (step 1920). Then the job execution management unit 221 creates job execution management information 222 based on the computer information received from the distributed memory storage management unit 223 and the information about the job to be executed, and holds it in the memory 122 (step 1930).

Figure 14:
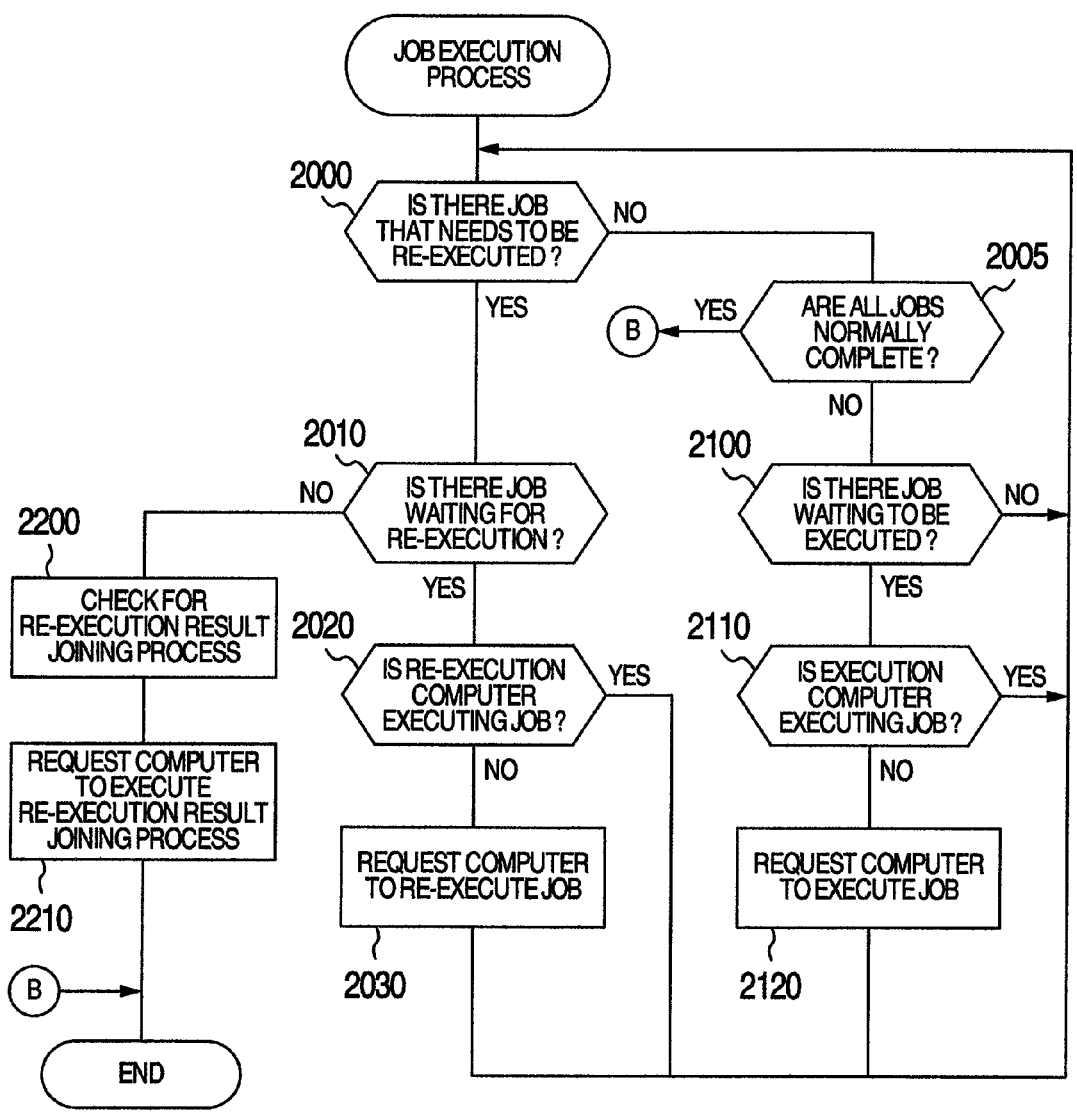
FIG. 14 is a flow chart of a job execution process performed by the job execution management unit 221.

FIG. 14 is a flow chart of a job execution process performed by the job execution management unit 221 in this embodiment.

The job execution management unit 221 refers to the execution status 450 in the job execution management information 222 to see if there is any job 200 that has failed to end normally due to a fault (step 2000). If no abnormally ended job is found, the job execution management unit 221 references the execution status 450 to check if all the jobs are completed normally. When all the jobs are finished normally, the job execution management unit 221 ends the job execution process (step 2005). If on the other hand not all jobs have yet been finished, the job execution management unit 221 references the job execution management information 222 to see if any job 200 using distributed data is waiting to be executed. If the waiting job 200 using distributed data is not found, the job execution management unit 221 returns to step 2000 (step 2100). If such a job is found at step 2100, the job execution management unit 221 references the job execution management information 222 to check whether, among the computers 110 assigned to execute the waiting jobs, there are any computers 110 that are executing other jobs. If such a computer is found, the job execution management unit 221 returns to step 2000 (step 2110).

If, among the computers 110 assigned to execute the waiting jobs, no computers are found that are currently executing other jobs, the job execution management unit 221 requests these computers 110 to execute the assigned jobs using distributed data (step 2120).

If step 2000 finds any job 200 that has failed to end normally, the re-execution using replicas of distributed data needs to be done. The job execution management unit 221 references the re-execution information by using the re-execution ID 460 of the job execution management information 222 as a key and checks whether there is any job 200 waiting to be re-executed using replicas of distributed data (step 2010). If such a waiting job 200 exists, the job execution management unit 221 further refers to the re-execution information to check whether the computer 110 that is assigned to execute the job 200 waiting to be re-executed is currently executing other job. If the computer 110 of interest is found to be executing other job, the job execution management unit 221 returns to step 2000 (step 2020).

If the computer 110 assigned to execute the job 200 waiting to be re-executed is found not executing other job, the job execution management unit 221 requests that computer 110 to re-execute the job using replicas of distributed data. Then, the job execution management unit 221 returns to step 2000 (step 2030).

If, as a result of referencing the re-execution information at step 2010, no job 200 is found waiting to be re-executed that uses the replicas of distributed data, the re-execution using the replicas of distributed data has already been completed. Then, the job execution management unit 221 references the distributed data disposition hint information 226 to check for a designation of a joining process on the results of re-executions by the computers 110 using the replicated distributed data (step 2200). Then the job execution management unit 221 requests the computer 110 that has re-executed the job using the replicas of distributed data to execute the joining process specified, before exiting the processing (step 2210).

Figure 15:
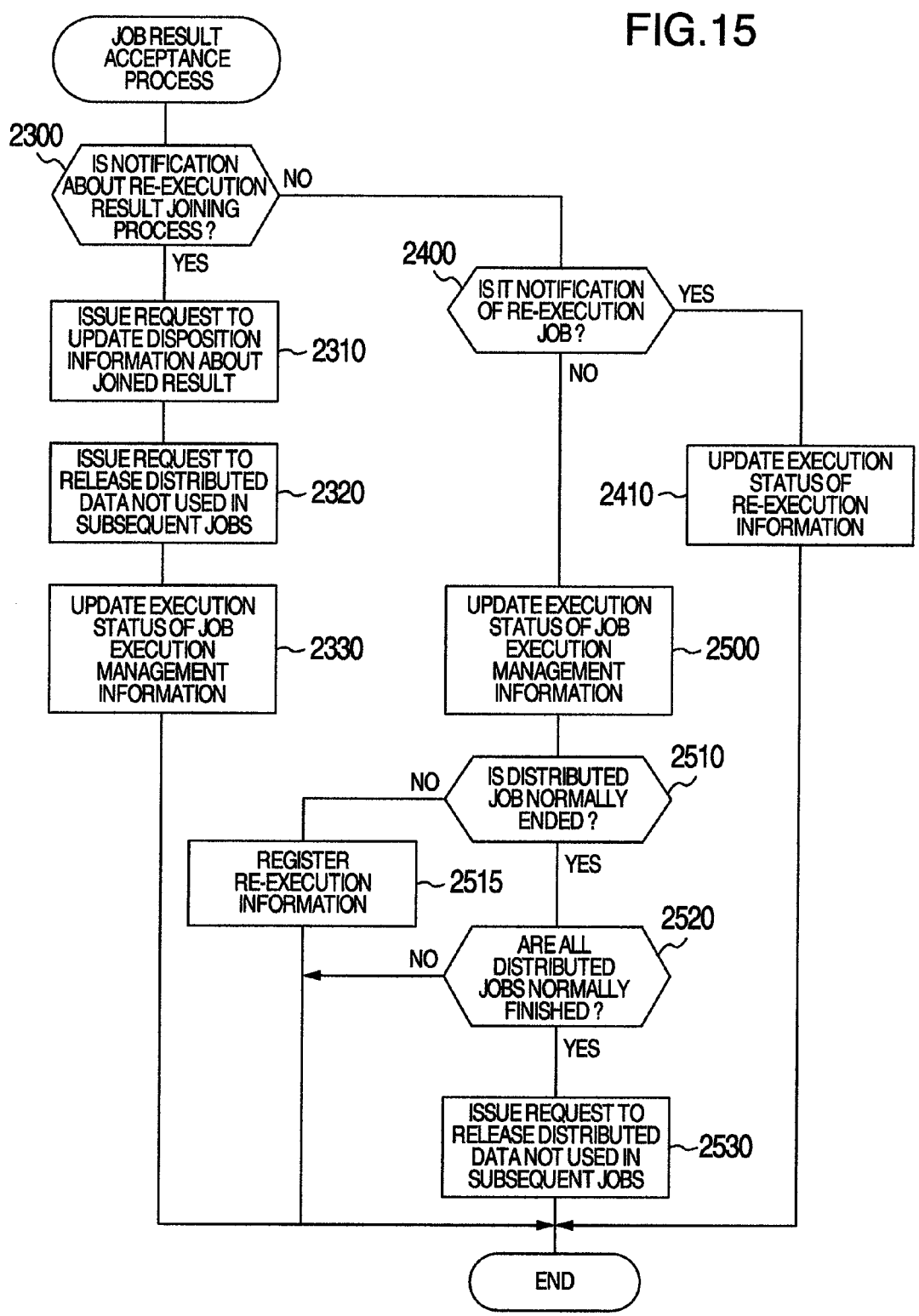
FIG. 15 is a flow chart of a job result acceptance process performed by the job execution management unit 221.

FIG. 15 is a flow chart of a job result acceptance process performed by the job execution management unit 221.

Upon receiving a job result notification from the computer 110, the job execution management unit 221 checks whether the notification received is a notification of the process for joining the results of re-execution using replicas of distributed data (step 2300). If the result notification received is a notification of the process for joining the results of re-execution using the distributed data replicas, the job execution management unit 221 requests the distributed memory storage management unit 223 to update the disposition information about the rejoined data of re-execution results.

Next, the job execution management unit 221 references the job execution management information 222 and requests the distributed memory storage management unit 223 to release the distributed data that will not used in the subsequent jobs (step 2320). Further, the job execution management unit 221 references the job execution management information 222 and updates the execution status of the original job 200 that has been re-executed (step 2330).

If step 2300 decides that the received result notification is not about the process for joining the results of re-execution using the distributed data replicas, the job execution management unit 221 checks whether the job result notification received from the computer 110 is a notification of the result of re-execution of the job using the replicas of distributed data (step 2400). If so, the job execution management unit 221 references the re-execution ID 460 of the job execution management information 222 and updates the execution status of the re-executed job (step 2410).

If step 2400 decides that the result notification is not about the result of job re-execution using the distributed data replicas, the job execution management unit 221 updates the execution status 450 of the job execution management information 222 according to the result notification of job execution received from the computer 110.

Next, the job execution management unit 221 checks whether the execution of job using the distributed data is normally completed (step 2510). If it is decided that the job execution using distributed data has not finished normally, the job execution management unit 221 receives from the distributed memory storage management unit 223 information about the computer 110 holding the replicas of distributed data used in the execution of the job that has failed to be completed normally, and registers it with the re-execution information (step 2515).

On the other hand, if step 2510 decides that the execution of a job using distributed data has normally been completed, the job execution management unit 221 refers to the job execution management information 222 to see if the execution of a job using other pieces of distributed data associated with the original data 230 is normally finished. If any jobs remain that failed to be normally completed, the job execution management unit 221 ends the processing (step 2520).

If step 2520 decides that the execution of jobs using other pieces of distributed data has normally been completed, the job execution management unit 221 refers to the job execution management information 222 to check for distributed data that will not be used in subsequent jobs, and requests the distributed memory storage management unit 223 to release the distributed data.

Figure 16:
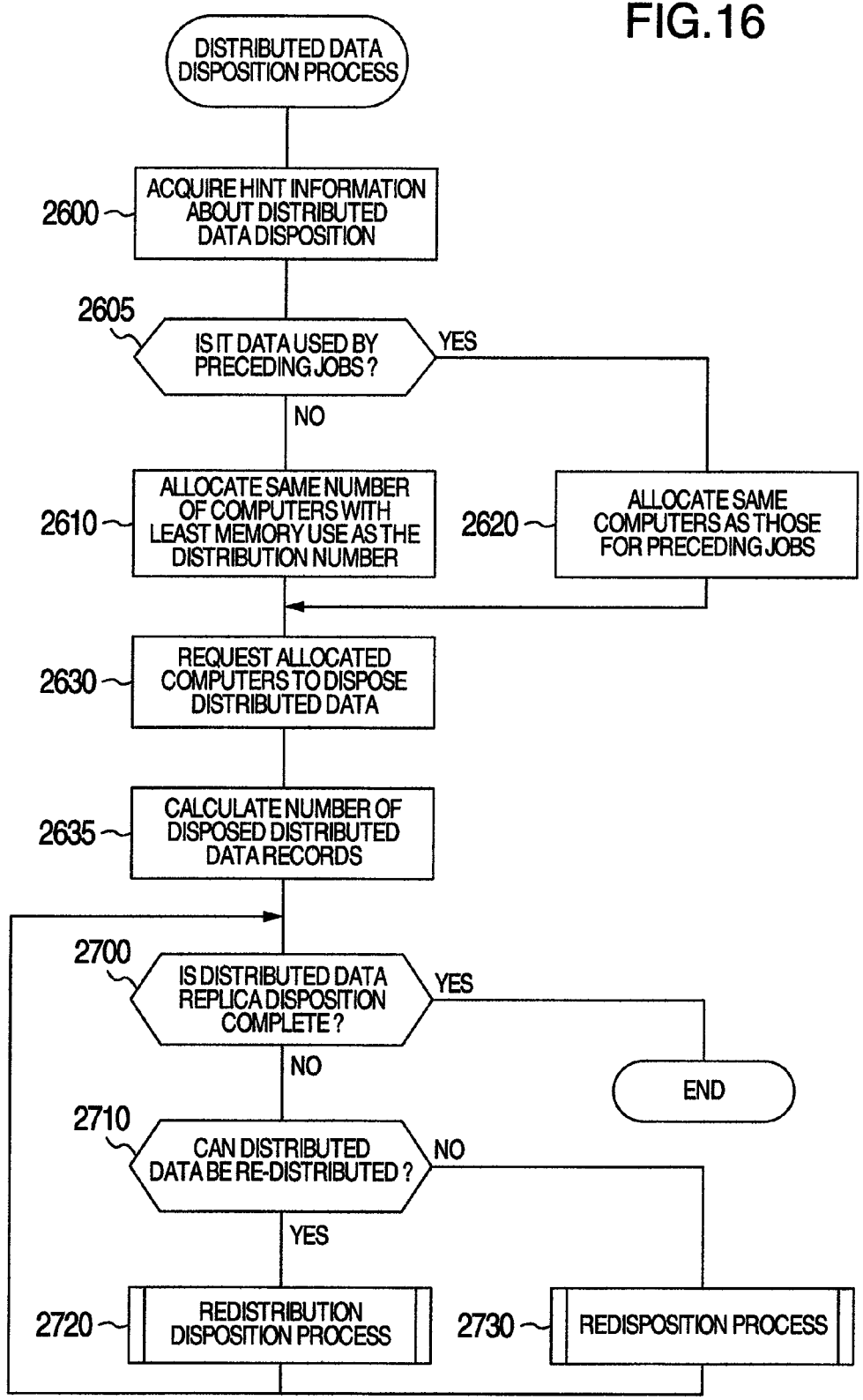
FIG. 16 is a flow chart of a distributed data disposition process performed by a distributed memory storage management unit 223.

FIG. 16 is a flow chart of distributed data disposition process performed by the distributed memory storage management unit 223 in this embodiment. This process is triggered by a distributed data disposition request from the job execution management unit 221.

In the distributed data disposition process, the distributed memory storage management unit 223 acquires hint information 226, based on which the data 230 used during job execution is distributively disposed in memories of a plurality of computers 110, along with the distributed data disposition request, from the job execution management unit 221 (step 2600). The distributed memory storage management unit 223 refers to the distributed data disposition information 225 to see if data already distributively disposed for the execution of the preceding jobs is included in the data requested to be distributively disposed (step 2605).

If the data requested to be distributively disposed does not include the data already distributively disposed for the execution of the preceding jobs, the distributed memory storage management unit 223 references the distributed memory storage management information 224 to allocate as many computers as necessary for the requested distributive disposition of data, in order from the least memory use to the greatest (step 2610). If on the other hand the data already distributively disposed for the execution of the preceding jobs is included in the data requested to be distributively disposed, the distributed memory storage management unit 223 allocates the same computers 110 as those for the preceding jobs (step 2620).

After securing the computers 110 at step 2610 or 1620, the distributed memory storage management unit 223 references the distributed data disposition hint information 226, requests the distributed memory management client program 210 to distributively dispose the distributed data making up the data requested to be distributively disposed and then registers information about these computers (computer IDs) with the distributed data disposition information 225 (step 2630). Next, the distributed memory storage management unit 223 calculates the number of records of the distributed data disposed in the allocated computers 110 and registers it in the corresponding entry in the distributed data disposition information 225 (step 2635).

With the above information registered with the distributed data disposition information 225, the distributed memory storage management unit 223 checks whether the replica ID 770 is set in the distributed data disposition information 225 to determine whether the distributive disposition of the replicas for all the distributed data disposed in the allocated computers 110 is finished. If the distributive disposition of the replicas for all the distributed data is found completed, the distributed data disposition process is ended (step 2700).

If on the other hand there is distributed data whose replica disposition has not yet been finished, the distributed memory storage management unit 223 references the distributed data disposition hint information 226 to determine whether the distributed data, from which a replica will be made, can be redistributed in a field that is used as a key (step 2710). If it is decided that the distributed data can be redistributed, the distributed memory storage management unit 223 performs a redistribution disposition process described later (step 2720). If not, the distributed memory storage management unit 223 performs a redisposition process described later (step 2730).

Figure 17:
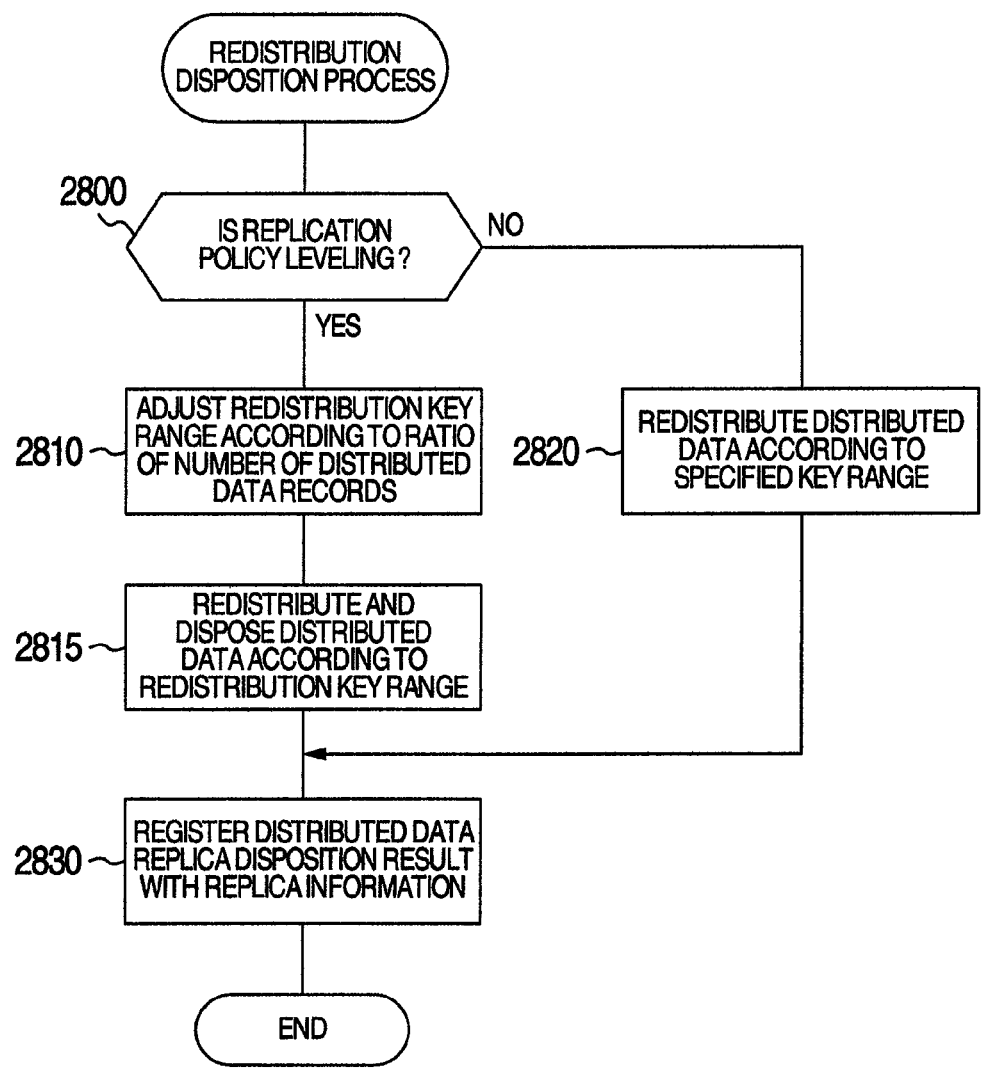
FIG. 17 is a flow chart of a redistribution disposition process.

FIG. 17 is a flow chart of a redistribution disposition process performed to redistribute the distributed data when creating a replica during the distributed data disposition process.

If it is found that the distributed data can be redistributed and disposed, the distributed memory storage management unit 223 references the distributed data disposition hint information 226 to see whether the replica generation policy is a leveling (step 2800). If so, the distributed memory storage management unit 223 references the distributed data disposition information 225 and adjusts the range of value in that field which is used as a key during redistribution so that ratios of the numbers of records of distributed data distributively disposed in other computers 110 than those with the distributed data, from which replicas are to be made, will, after the redistribution, become reciprocals of the ratios (step 2810). After adjusting the range of value in that field which is used as a key during redistribution, the distributed memory storage management unit 223 according to the range of field value requests the distributed memory management client program 210 in those computers 110 in which the replicas are to be disposed that the client program 210 dispose the replicated distributed data (step 2815).

Then, the distributed memory storage management unit 223 registers the information about the distributed data replicas in the replica information and also registers its replica ID in a replica ID column in the distributed data disposition information 225 (step 2830).

If on the other hand step 2800 decides that the replica generation policy is not a leveling, the distributed memory storage management unit 223 references the distributed data disposition hint information 226 and, according to the range of value in the field to be used as a user-specified key, requests the distributed memory management client program 210 executed in other computers 110 than those with the distributed data that the client program 210 dispose the replicated distributed data. After this, the distributed memory storage management unit 223 proceeds to step 2830 (step 2820).

Figure 18:
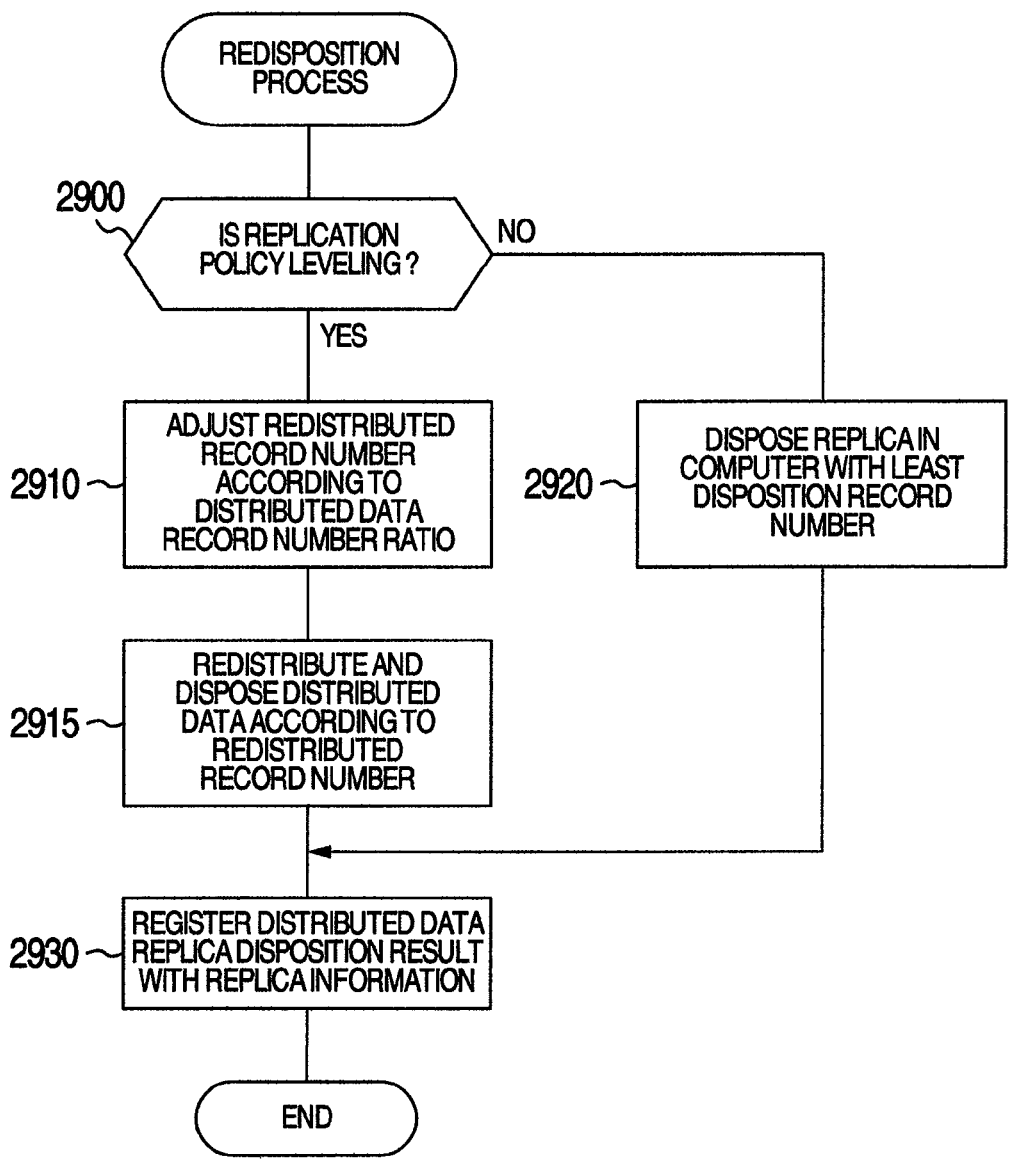
FIG. 18 is a flow chart of a redisposition process.

FIG. 18 is a flow chart of a redisposition process performed when the distributed data cannot be redistributed during the process of making a replica in the distributed data disposition process.

When the distributed data cannot be distributively disposed again, the distributed memory storage management unit 223 references the distributed data disposition hint information 226 to determine whether the replica making policy is a leveling (step 2900). If the replica making policy is a leveling, the distributed memory storage management unit 223 references the distributed data disposition information 225 and adjusts the number of records in which to dispose the distributed data, by using reciprocals of ratios of the number of records of distributed data held in other computers 110 than those with the distributed data, from which replicas are to be created, in order to level the volumes of distributed data disposed in the computers 110 (step 2910). After the adjustment of the number of records, the distributed memory storage management unit 223 according to the adjusted number of records requests the distributed memory management client program 210 in the remaining computers 110 to dispose the distributed data replicas (step 2915).

After this, the distributed memory storage management unit 223 registers the information about the distributed data replicas with the replica information and also registers their replica IDs in the replica ID column of the distributed data disposition information 225 (step 2930).

If on the other hand step 2900 decides that the replica making policy is not a leveling, the distributed memory storage management unit 223 references the distributed data disposition information 225 and requests the distributed memory management client program 210 in one of the remaining computers 110—other than those with distributed data from which replicas are to be created—which has the least number of records that the client program 210 dispose the distributed data replicas. Then, the distributed memory storage management unit 223 proceeds to step 2930 (step 2915).

Figure 19:
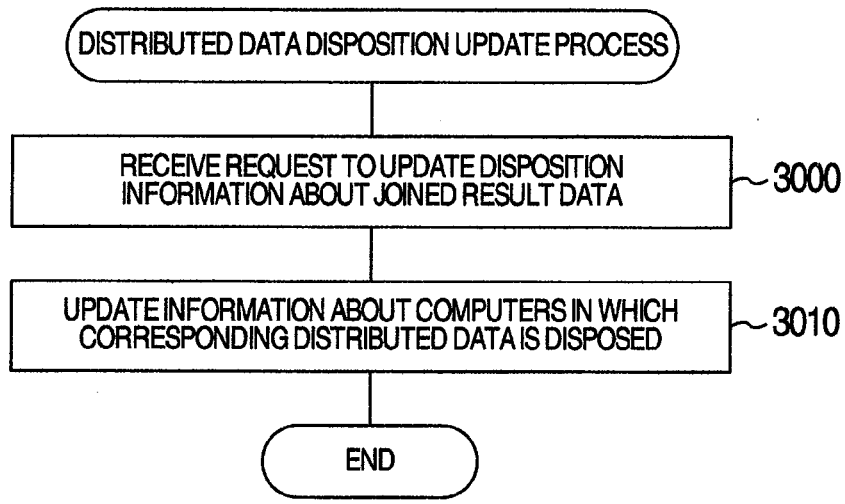
FIG. 19 is a flow chart of a distributed data disposition update process performed by the distributed memory storage management unit 223.

FIG. 19 is a flow chart of a distributed data disposition update process performed by the distributed memory storage management unit 223 in this embodiment. When a job is re-executed using the replicas of distributed data, this normally results in the data being disposed differently than when the original distributed data was processed. In such situations the distributed data disposition update process is performed to update the disposition information.

Upon receiving a request for updating the disposition information on the joined re-execution result data from the job execution management unit 221 (step 3000), the distributed memory storage management unit 223 references the distributed data disposition information 225 and updates the information about the computers 110 with the original distributed data corresponding to the re-execution result data to the information about the computers 110 in which the re-execution result data is disposed (step 3010).

Figure 20:
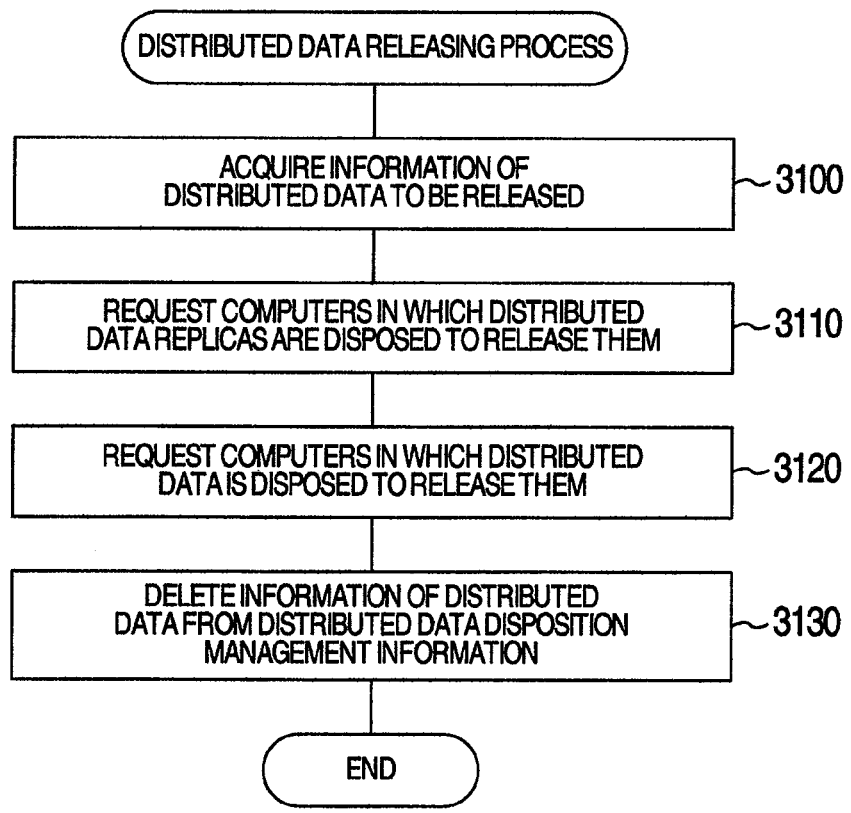
FIG. 20 is a flow chart of a distributed data releasing process performed by the distributed memory storage management unit 223.

FIG. 20 is a flow chart of a distributed data releasing process performed by the distributed memory storage management unit 223 in this embodiment. This process is triggered by a release request issued by the job execution management unit 221 at step 2530 during the job result receiving process.

The distributed memory storage management unit 223 acquires from the job execution management unit 221 a distributed data release request and a data ID as information about the distributed data to be released (step 3100). The distributed memory storage management unit 223 references the replica information by using as a key the replica information ID 770 that was registered in connection with the data ID acquired as the distributed data disposition information 225 and locates the computers 110 in which the distributed data replicas to be released are disposed. The distributed memory storage management unit 223 then requests the distributed memory management client program 210 in the located computers 110 to release the areas of memory storage 213 in which the replicas are stored (step 3110). The distributed memory storage management unit 223 further references the distributed data disposition information 225 to locate the computers 110 in which the distributed data of the acquired data ID is disposed and requests the distributed memory management client program 210 in these computers to release the areas of the memory storage 213 in which the distributed data of interest is stored (step 3120).

After issuing a memory release request to the associated computers 110, the distributed memory storage management unit 223 deletes the disposition information about the distributed data for which the release request has been made (step 3130).

Figure 21:
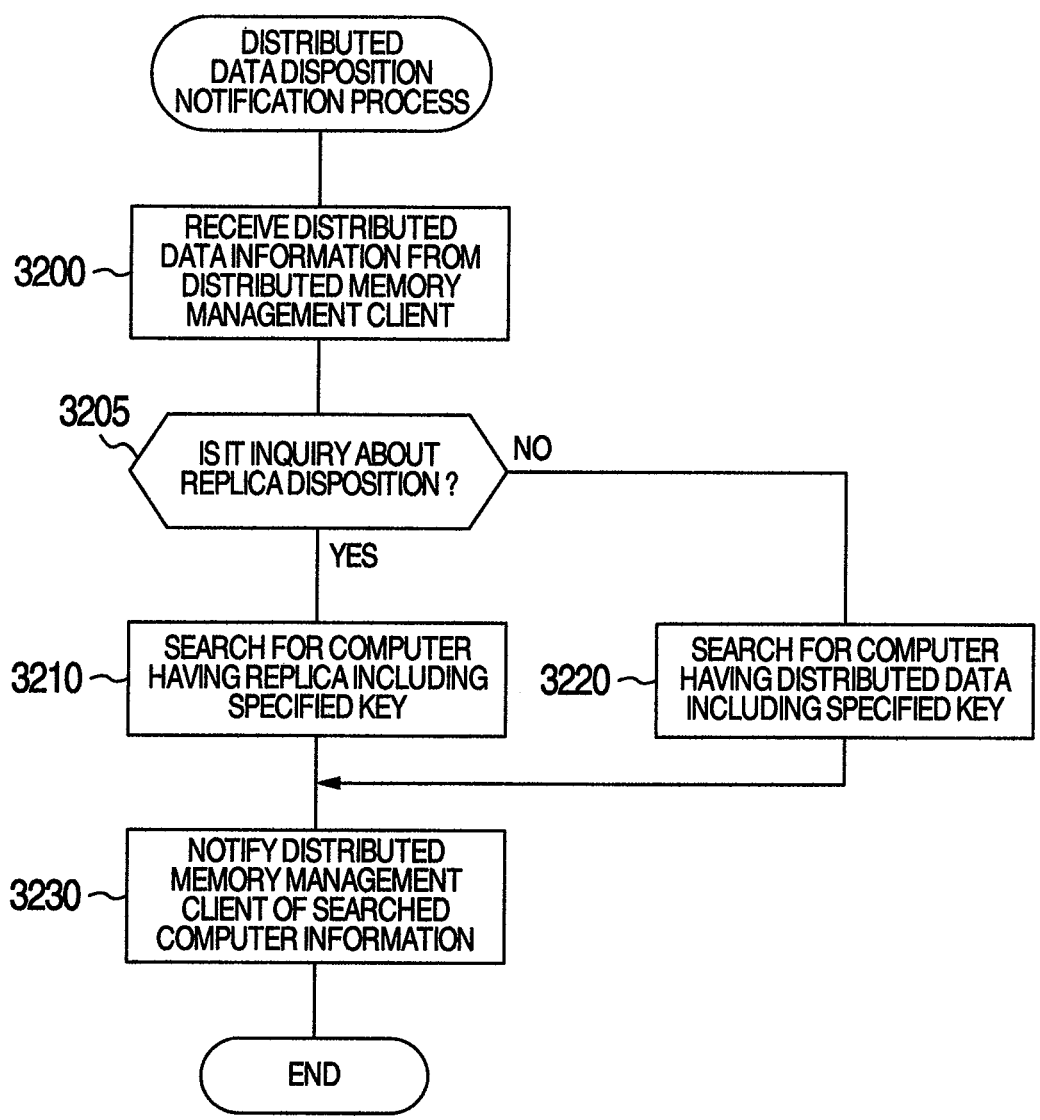
FIG. 21 is a flow chart of a distributed data disposition notification process performed by the distributed memory storage management unit 223.

FIG. 21 is a flow chart of a distributed data disposition notification process performed by the distributed memory storage management unit 223 in this embodiment. This process is performed in response to a query from the distributed memory management client program 210, i.e., in response to a query issued by step 1320, 1600 in the memory storage access process and by step 1815 in the inter-computer accessing process. This query includes as information an ID of the distributed data of interest and a key to locate records.

Upon receiving the inquiry from the distributed memory management client program 210 in a computer 110 (step 3200), the distributed memory storage management unit 223 based on the ID of the distributed data specified by the inquiry checks whether the received inquiry about the disposition of the distributed data concerns the replica of the distributed data (step 3205).

If the received inquiry is for the replica of distributed data, the distributed memory storage management unit 223 references the replica ID 770 of the distributed data disposition information 225 and searches for a computer 110 in which the replica including the key specified by the inquiry is disposed (step 3210). If on the other hand the received inquiry does not concern the disposition of replica, the distributed memory storage management unit 223 references the distributed data disposition information 225 and searches for a computer 110 in which the distributed data including the key specified by the inquiry is disposed (step 3220).

If at step 3210 or 3120 the computer 110 of interest is found, the distributed memory storage management unit 223 returns the information including the computer ID to the distributed memory management client program 210 in the computer, the source of the inquiry (step 3230).

In this embodiment, the distributed memory management server program distributively dispose distributed data and its replicas in a plurality of computers according to the distributed data disposition hint information entered by the user. The disposition of the replicas among the computers is determined according to the ratio of the number of distributed data records disposed in each computer. This allows the processing executed in each of the computers, including the re-execution of jobs in the event of a fault, to be leveled among the computers. Further, even with the distributed data that cannot be redistributed, the distributed memory management client program 210 can have their replicas so distributively disposed as to level the amount of memory use among the computers by making the accesses from jobs to the redistributed replicas look transparent to those accesses to the original distributed data.

This invention has been described in detail with reference to the embodiment. It is needless to say that the invention is not limited to the above embodiment and that various modifications and changes may be made without departing from the spirit of the invention.

This invention is applicable to the processing method performed in the event of a fault in a computer system and particularly the method of re-executing data processing in the event of a fault in a system where large volumes of data are parallelly processed by a plurality of computers.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing method in a computer system having a plurality of first computers to distributively execute data processing, a second computer to manage the execution of the data processing by the plurality of the first computers, a storage device storing data used in the data processing, and a network interconnecting the plurality of the first computers, the second computer and the storage devices, the data processing method comprising the steps of:

according to hint information given to the second computer and indicating a policy on the distributive disposition of the data in the plurality of the first computers, dividing the data held in the storage device into a plurality of pieces of distributed data;

distributively disposing the distributed data and replicated data of each piece of the distributed data in memories of the plurality of the first computers; and performing data processing by the plurality of the first computers using the distributed data disposed in each of the first computers, wherein, in the event of a fault in any of the first computers, the data processing that was being executed in the faulty first computer at the time of the fault is re-executed by another first computer that holds the replicated data of the distributed data disposed in the faulty first computer, wherein the hint information includes information about whether the distributed data can be further distributively disposed, and wherein, when the hint information indicates that the distributed data can be further distributed, the distributively disposing step further includes dividing each of the pieces of the distributed data according to the hint information, creating the replicated data of the further divided distributed data, and disposing the pieces of the replicated data in first computers other than the first computer in which is disposed the original distributed data from which the replicated data has been created.

2. A data processing method according to claim 1, wherein, when the hint information indicates that the distributed data cannot be further distributed, the distributively disposing step distributively disposes the replicated data of each piece of the distributed data so that the volumes of the distributed data and the replicated data placed in the first computers are leveled among the computers.

3. A data processing method according to claim 2, wherein the hint information includes information specifying a processing method performed on the result of re-execution of data processing using the replicated data, and
wherein, after the re-execution of data processing using the replicated data, the second computer requests, according to the information specifying the processing method, the first computers to perform processing on the result of re-execution of data processing using the replicated data.

4. A data processing method according to claim 1, wherein, when the hint information indicates that the distributed data cannot be further distributed, the distributively disposing step disposes the replicated data in a first computer with a least amount of the disposed distributed data.

5. A computer system comprising:
a storage device storing data;
a plurality of first computers connected with the storage device and configured to manage data processing using the data; and
a plurality of second computers connected with the first computers and configured to distributively execute the data processing,
wherein the first computers each have a distributive disposition unit and an execution management unit,
the distributive disposition unit configured to reference given hint information indicating a policy of distributive disposition of the data in a plurality of the second computers, divide the data held in the storage device into a plurality of pieces of distributed data and distributively dispose the pieces of the distributed data and each piece of replicated data of the distributed data into memories of the plurality of the second computers, and
the execution management unit configured to request the second computers to execute the data processing and, in the event of a fault in any of the second computers, request another second computer to re-execute the data processing that was being executed in the faulted second computer at the time of fault,
wherein the second computers each have a memory management unit and a data processing unit,
the memory management unit being configured to hold the distributed data in a memory of its own computer in response to a request from the distributive disposition unit, and
the data processing unit being configured to execute the data processing in response to a request from the execution management unit,
wherein the hint information includes information indicating whether each piece of replicated data of the distributed data can be further distributively disposed.

6. A computer system according to claim 5, wherein, when the hint information indicates that the distributed data can further be distributed, the distributive disposition unit according to the hint information further divides each piece of the distributed data, creates the duplicated data and disposes each piece of the duplicated data in second computers other than the second computer in which is disposed the original distributed data from which the replicated data has been created.

7. A computer system according to claim 6, wherein, when the hint information indicates that the distributed data cannot be further distributed, the distributive disposition unit disposes the duplicated data of each piece of the distributed data so that the volumes of the distributed data and the duplicated data disposed in the second computers are leveled among the computers.

8. A computer system according to claim 6, wherein, when the hint information indicates that the distributed data cannot be further distributed, the distributive disposition unit disposes the duplicated data in a second computer with a least amount of the disposed distributed data.

9. A computer system according to claim 5, wherein the hint information includes information specifying a processing method performed on the result of re-execution of data processing using the replicated data.

10. A computer system according to claim 9, wherein, after the re-execution of data processing using the replicated data, the distributive disposition unit requests, according to the information specifying the processing method, the second computers to perform processing on the result of re-execution of data processing using the replicated data.

* * * * *